United States Patent
Geday et al.

(10) Patent No.: US 11,314,142 B2
(45) Date of Patent: Apr. 26, 2022

(54) CONFIGURABLE OPTICAL DEVICE

(71) Applicant: UNIVERSIDAD POLITECNICA DE MADRID, Madrid (ES)

(72) Inventors: Morten Andreas Geday, Madrid (ES); Manuel Caño Garcia, Madrid (ES); Jose Manuel Oton Sanchez, Madrid (ES); Patxi Xabier Quintana Arregui, Madrid (ES); Jacob Andreas Geday, Madrid (ES)

(73) Assignee: UNIVERSIDAD POLITECNICA DE MADRID, Madrid (ES)

( * ) Notice: Subject to any disclaimer, the term of this patent is extended or adjusted under 35 U.S.C. 154(b) by 0 days.

(21) Appl. No.: 17/274,865

(22) PCT Filed: Sep. 11, 2019

(86) PCT No.: PCT/ES2019/070599
§ 371 (c)(1),
(2) Date: Mar. 10, 2021

(87) PCT Pub. No.: WO2020/053463
PCT Pub. Date: Mar. 19, 2020

(65) Prior Publication Data
US 2022/0050355 A1 Feb. 17, 2022

(30) Foreign Application Priority Data
Sep. 14, 2018 (ES) ................ ES201830891

(51) Int. Cl.
*G02F 1/29* (2006.01)
(52) U.S. Cl.
CPC .......... *G02F 1/294* (2021.01); *G02F 2203/18* (2013.01)
(58) Field of Classification Search
CPC .................................... G02F 1/294
See application file for complete search history.

(56) References Cited

U.S. PATENT DOCUMENTS

| 5,408,281 | A | 4/1995 | Zhang | |
|---|---|---|---|---|
| 8,553,197 | B2 * | 10/2013 | Galstian | G02B 13/0075 349/200 |

(Continued)

FOREIGN PATENT DOCUMENTS

| CN | 206162019 U | 5/2017 |
|---|---|---|
| KR | 20120124344 A | 11/2012 |
| WO | 2012/080532 | 6/2012 |

OTHER PUBLICATIONS

Albero, J. et al., "Liquid Crystal Devices for the Reconfigurable Generation of Optical Vortices," in Journal of Lightwave Technology, vol. 30, No. 18, pp. 3055-3060, Sep. 15, 2012, Retrieved on-line doi: 10.1109/JLT.2012.2211567.

(Continued)

*Primary Examiner* — Edmond C Lau
(74) *Attorney, Agent, or Firm* — Jayne Marie Saydah (57) ABSTRACT

Configurable optical device comprising an optical element (1) or various optical elements (1) arranged in series, wherein each element (1) comprises an active region (2) with an entry surface (21) and an exit surface (22) for light beams, and a perimeter (3); each element (1) comprising at least one first transparent electrode (4) and at least one transparent counter electrode (5) the corresponding electrical connections being located in the perimeter (3); the device being configured such that, upon application of a potential difference between electrodes (4, 5) of each element (1), an electric field that alters the degree of commutation in different regions of the active zone (2) of each element (1) is generated, thus creating a varying optical path profile in each element (1), which allows an incident light beam to be focused in different ways, depending on the electric field applied to each electrode.

15 Claims, 9 Drawing Sheets

(56) References Cited

U.S. PATENT DOCUMENTS

2008/0226844 A1    9/2008  Shemo
2010/0007807 A1    1/2010  Galstian
2016/0202493 A1*  7/2016  Hong .................... G02B 30/27
                                                     349/33

OTHER PUBLICATIONS

PCT International Search Report, O. Gonzalez, Penalba, dated Dec. 12, 2019.
PCT Written Opinion of the International Searching Authority, dated Dec. 12, 2019.

* cited by examiner

CONFIGURABLE OPTICAL DEVICE

CROSS-REFERENCE

This application is the U.S. National Stage of International Application No. PCT/ES2019/070599 filed on Sep. 11, 2019, which claims the benefit of priority from Spanish Patent application No. P201830891 filed on Sep. 14, 2018, the contents of which are both herein incorporated by reference in their entirety.

BACKGROUND OF THE INVENTION

Field of the Invention

The present invention relates to a configurable (or reconfigurable) optical device capable of introducing a radial variation in the phase profile of arbitrary incident radiation.

The device is based on one or more liquid crystal cells in series, provided with electrodes structured so that all the electrodes are accessible from the periphery of the cell, and consequently are able to be directed independently. The specific design of the electrodes, which is part of the invention, allows reconfigurable lenses and wavefront correctors to be manufactured.

The present invention also relates to a method for manufacturing the aforementioned configurable optical device.

The device object of the present invention has application in the field of design and commercialisation of optical devices for different types of industries, such as the aerospace, health, security, transportation, communications industries, etc.

Description of Related Art

Lenses that are commonly used are based on light refraction. Lenses based on light diffraction are also well known, also known as Fresnel lenses, which are diffractive lenses with a fixed focus, without a topological charge (or zero topological charge).

Certain types of vortex lenses are known in the state of the art, such as spiral diffractive lenses. A spiral diffractive lens is characterised by the profile thereof, which is described by the topological charge thereof, and in the case of a focusing lens, by the focal length thereof.

Optical vortex beams, or vortices, are less common and not well-known by the general public. A vortex is an optical beam wherein the phase of the light varies spatially in an azimuthal manner around the centre of the beam. Typically, the phase varies by a number which is an integer multiple of $2\pi$, in a revolution around the centre of the beam. The number, an integer multiple of $2\pi$, is known as the topological charge of the vortex.

The elements defined in this patent are all elements which change the topological charge of an incident beam.

Likewise, a type of contact lens is known, such as the one disclosed in document U.S. Pat. No. 5,408,281 A, which has a spiral geometry and the capacity to focus.

Likewise, document US 2008226844 A1 is known, relating to configurable spiral phase plates, but based on non-uniform alignment and which does not use lenses in series.

Likewise, document WO 2012/080532 is known, which defines a reconfigurable beam reflectarray for frequencies in the terahertz and millimetre-wave ranges, based on reconfigurable resonant dipole structures in liquid crystal cells.

To date, no optical device is known that uses one same passive electrode structure to create spiral diffractive lenses with different focal lengths, depending only on the field applied to the different electrodes and without aliasing present in the pixelated devices.

To date, no optical device is known which combines two vortex-creating structures in series. The combination of such structures in series of the present invention makes it possible to emulate, by means of a single device, practically all types of optical lenses, as well as configure the optical features thereof according to what is needed.

A device of this type can compete with spatial light modulators (SLM), with the added advantages of having a higher fill factor, not having aliasing and lacking electronic components in the active part thereof, therefore transmitting more light. It is also structurally and electronically simpler and therefore cheaper.

The present invention takes advantage of some of the basic properties of liquid crystals (LCs), specifically the dielectric and optical molecular anisotropy thereof. The fluid nature of LCs combined with the intrinsic dielectric anisotropy thereof implies that, on a macroscopic scale, the material tends to orient itself offering the highest dielectric constant thereof to the applied field.

In the most common LCs, nematic calamitic liquid crystals, the molecules have an elongated shape; the longest axis of the molecule corresponds approximately to the axis of the highest dielectric constant and the optical axis of anisotropy, also called the indicatrix. Thus, the highest refractive index and highest dielectric constant are parallel to the longest axis of the molecule. These materials are called positive LCs.

There are LCs with negative dielectric anisotropy, wherein the molecular axis coincides with the highest refractive index (the indicatrix) and the lowest dielectric constant. In this description, uniaxial anisotropies are assumed, an approximation which is valid for all relevant liquid crystal (LC) cases in this invention.

In other LC materials, such as blue phase liquid crystals, an isotropic material can transform into an anisotropic material by applying an electric field. In such cases, the index tends to increase in the direction of the field, and decrease in the perpendicular direction.

Additionally, LCs are ordered fluids. They have an intrinsic macroscopic order generated by intermolecular viscoelastic forces which extends to hundreds of $\mu m$, which allows them to be aligned, in the absence of external fields, with relatively weak surface interactions.

Thus, it is possible to induce a preferential alignment of the LC by means of the appropriate surface treatment, which is transmitted to the rest of the material, provided that the volume of the LC is confined in a cell with parallel faces located at a short distance. Said alignment can be eventually altered by applying an external electric field. Commutation between one state and another is determined by the plane defined by the alignment direction and the direction of the electric field.

As a consequence, the refractive index or indices perceived by the light passing through an LC can be modified by means of applied electric fields, causing the optical path length (OPL) or the state of polarisation (SOP) of the incident light.

The modification of the SOP is the basis on which liquid crystal displays (LCDs) are built. By controlling the SOP, the amount of light passing through the system can be controlled, with the help of one polariser or two polarisers. An LCD is usually made up of an LC cell that is backlit or provided with a rear mirror, whereon the LC cell is positioned between polarisers. The cell has an electrical excitation system formed by electrodes in the form of segments (alphanumeric displays) or a rectangular matrix of pixels such as the kind carried by mobile phones, projectors and TVs.

OPL variations are the basis for LC lenses, and more generic LC photonic devices such as spatial light modulators (SLM). These devices make it possible to manipulate at least one of the polarisations of the incident wavefront.

Transparent LC lenses are usually based on concentric electrodes to which different voltages are applied. Connecting concentric elements is complex if multilayer assemblies of the electrodes are not chosen, which in turn have their own problems. Consequently, complex directing schemes with very limited tunability ranges must be used, or intertwined electrodes with spiral shapes.

SLMs are based on technologies derived from the commercial production of LCDs, although they must be prepared to achieve maximum phase lags of $2\pi$, instead of the lag of $\pi$ usually required for LCD displays. High-performance SLMs are based on very high-density rectangular arrays of pixels, which allow almost arbitrary adjustments of the wavefronts. However, most displays are direct vision displays, with a pixel size of tens of $\mu m$ (less than the visual acuity of the human eye), or transmissive or reflective projection devices such as LCoS (liquid crystal on silicon).

Direct vision devices generally use thin-film transistors (TFTs) in an active matrix, which reduces the number of electrodes required to control the large number (millions) of individual pixels that a display carries. A significant portion of the active area of the display is occupied by the TFTs and the circuitry thereof, reducing the so-called fill factor (light transmission) of the display. The problem is exacerbated in transmissive projection devices, because the small size of the pixels thereof reduces the fill factor to the point that the resolution of such devices is limited in practice. In reflective LCoS devices, the transistors and microelectronic circuitry are installed behind the display and do not affect the fill factor.

In either case, the control electronics are above the pixels or below the active area, which is undesirable in certain applications, specifically those wherein the LC cell is exposed to intense electromagnetic radiation or ionising radiation, which can deteriorate the micro- and nanoelectronic elements of the circuits.

The present invention is presented within this context. It is a transparent device formed by electrodes with various shapes, capable of creating LC lenses of any profile with an arbitrary number of pixels, which are directed from the perimeter of the active area. The device has several advantages over current devices:

It is transparent, unlike most high-resolution SLMs.
It lacks electronic elements in the active area
It can be directed with an arbitrary number of individual pixels, with no electrode interconnection or overlap in any region.
It has a remarkably high fill factor, limited only by the gap between electrodes
It intrinsically lacks aliasing Apart from liquid crystals, there are other materials with an electro-optical effect wherein the optical anisotropy of the material changes when an electric field is applied. In these materials, the refractive index tends to increase in the direction of the field and decrease in the perpendicular direction, or vice versa. In the present invention, LCs can be replaced by materials with an electro-optical effect such as lithium niobate or by liquids that exhibit the Pockels or Kerr effect.

BRIEF SUMMARY OF THE INVENTION

In view of the prior art, the following configurable (and/or tunable) optical device, object of the present invention, is presented.

The configurable optical device object of the present invention comprises a configurable optical element or various configurable optical elements arranged in series. Each optical element comprises an active region made up of an entry surface (or transparent substrate) and an exit surface (or transparent substrate) for light beams.

Each optical element includes at least one first transparent electrode and at least one transparent counter electrode (or second electrode).

The electrical connections for the electrodes are located in the perimeter region of each optical element, so that there are no connecting tracks penetrating the active region.

According to a possible embodiment, the first electrode of at least one of the optical elements is divided into sections, so that the device is configured to generate electric fields with different intensities between each section of the first electrode and the second electrode.

The device is configured such that, upon application of a potential difference between different sections of the electrodes of each optical element, different electric fields that alter the degree of commutation in different areas of the active region of each optical element are generated, thus creating a varying OPL profile in each of the optical elements of the device. This configures a certain topological charge and a certain focus of the incident light beam, according to the pattern of electric fields applied to the sections of the first electrode.

According to a possible embodiment, the optical elements are liquid crystal cells (or polymerisable liquid crystal cells) with the corresponding electrodes thereof. As an alternative to liquid crystal, the optical elements could be made up of some other electro-optical material (with the ability to alter the refractive index thereof in the presence of an electric field) and the corresponding electrodes thereof.

Thus, there are partial commutations (depending on the number and arrangement of sections of the electrodes), which allow the refractive index of different regions of each optical element to be locally altered.

According to a possible embodiment, the counter electrode is also divided into sections. In this case, both electrodes are configured both to have different electrical potentials in each section and to have equal electrical potentials in each section. The section distribution of the first electrode can be different from the section distribution of the counter electrode, thus allowing the device to be reconfigured (tuned) in order to create two independent sets of optical path profiles, which changes the topological charge and the focus of an incident light beam in different ways.

Optical elements wherein the counter electrode is not divided into sections, or optical elements wherein the counter electrode is divided into sections, or a series of optical elements wherein one has the counter electrode divided into sections and the other has the counter electrode not divided into sections, can be arranged in series.

According to a possible embodiment, an optical element acts as a variable spiral diffractive lens. Depending on the applied pattern, an optical path is produced with a certain focal length and topological charge. Thus, upon application of a first suitable pattern of electric fields, the optical path profile of the optical element corresponds to that of a spiral diffractive lens with a first focal length and a first topological charge, while upon application of a second suitable pattern of electric fields, the optical path profile of the optical element corresponds to that of a spiral diffractive lens with a second focal length and a second topological charge.

According to another possible embodiment, a pair of optical elements acts together, emulating a variable diffractive lens.

According to another possible embodiment, a pair of optical elements acts together, emulating a variable axicon.

According to another possible embodiment, a pair of optical elements acts together, emulating a variable spiral diffractive lens.

According to another possible embodiment, a pair of optical elements acts together, emulating the combination of at least two of the following systems: a lens, an axicon or a spiral phase plate.

Thus, upon application of the corresponding electric fields, the optical path profile of at least one of the adjacent optical elements placed in series can correspond to that of a spiral diffractive lens, while the optical path profile of at least one of the remaining adjacent optical elements placed in series may correspond to that of a spiral phase plate.

According to a particular embodiment, the first electrode of two adjacent optical elements placed in series is divided into sections, the distribution of the sections of the first electrode of an optical element being a mirror image of the distribution of the sections of the first electrode of the adjacent optical element.

Thus, upon application of the corresponding electric fields, the commutation profile of the two adjacent optical elements placed in series corresponds to that of two spiral diffractive lenses with inverse topology, and the combination of elements emulates a diffractive lens.

According to another particular embodiment, upon application of the corresponding electric fields, the commutation profile of two adjacent optical elements placed in series corresponds to that of two spiral diffractive lenses. Preferably, both spiral diffractive lenses are positioned in series, with a certain gap between them, so that the focal lengths of both lenses coincide, which allows them to function as a tunable telescope or beam expander, altering the topological charge and focus of the lenses, applying the suitable patterns of electric fields to the sections of the electrodes of the optical elements.

According to another particular embodiment, a third element is added to the previous embodiment so that the combination of elements results in a device that does not affect the topological charge of the light.

According to a possible embodiment, at least one of the electrodes of at least one optical element includes structures with electromagnetic resonance frequencies which are variable depending on the degree of commutation of the adjacent liquid crystal.

According to one possible embodiment, the electrodes take the form of poles having electromagnetic resonance frequencies for frequencies in the terahertz and millimetre-wave and micrometre-wave ranges. Upon application of a polarisation field to the dipoles, a phase profile can be created for these frequencies, as well as the phase profile created for the embodiments for light beams.

The present invention in turn envisages a method for manufacturing a configurable optical device.

The manufacturing method comprises:
arranging an optical element or various optical elements placed in series, wherein each optical element comprises an active region consisting of an entry surface and an exit surface for light beams, wherein each optical element comprises at least one first transparent electrode and at least one second transparent electrode, wherein each optical element has electrical connections for the electrodes, said electrical connections being located in the perimeter region of each optical element outside the active region, wherein each of the optical elements of the device changes the topological charge of an incident light beam.

applying a potential difference between the electrodes of each optical element, thus producing an electric field that alters the refractive index of the optical element, thus creating a selective commutation profile in each of the optical elements of the device, thus altering the optical path profile of each optical element, which changes the topological charge of an incident light beam.

Preferably, the method envisages that the optical elements are liquid crystal lenses, each lens being made up of a liquid crystal cell located between at least one first electrode and at least one second electrode.

Also, preferably, the method envisages that the liquid crystal of the lenses is polymerisable, also known as reactive mesogen (RM). The method then comprises the possibility of curing (by means of UV radiation or another curing method) the polymerisable liquid crystal, obtaining a diffractive device with a variation profile having a fixed or partially tunable phase.

According to a possible embodiment, the method comprises applying an electric field between the electrodes of two adjacent optical elements placed in series creating a commutation profile of the two adjacent optical elements corresponding to that of two spiral diffractive lenses. Likewise, according to a possible embodiment, the method comprises positioning both spiral diffractive lenses in series, with a certain gap between them, so that the focal lengths of both lenses coincide, which allows them to function as a tunable telescope or beam expander, altering the topological charge of the lenses.

BRIEF DESCRIPTION OF THE SEVERAL VIEWS OF THE DRAWINGS

As a part of the explanation of at least one preferred embodiment of the device, the following figures have been included, which by way of illustration and not limitation represent the following.

DETAILED DESCRIPTION OF THE INVENTION

The present invention relates, as already mentioned above, to a configurable optical device.

The device is based on an optical element or a pair of optical elements (1) which, preferably, are LC cells with multiple electrodes (4, 5).

Each LC cell is constructed like a classic LC cell (see FIG. 1) with the LC (1.$a$) sandwiched between two transparent substrates (1.$b$.1 and 1.$b$.2) with electrodes (4, 5) that are also transparent, and treated with an alignment layer or agent (1.$d$.1 and 1.$d$.2).

Figure 1:
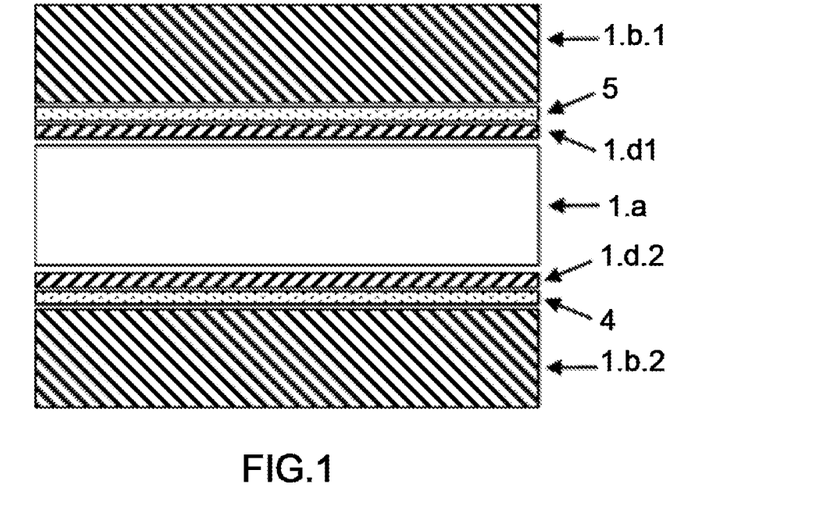
FIG. 1 shows a schematic view of a classic liquid crystal (LC) cell.

When an electric field is applied between the counter electrode (5) or upper electrode (as shown in the figures) and the first electrode (4) or lower electrode (as shown in the figures), the LC is aligned up to a certain point depending on the viscosity of the material, the anchoring forces of the surface layers (1.$d$.1 and 1.$d$.2), the thickness of the LC (1.$a$) and the intensity of the electric field.

In order to create an arbitrary commutation profile, at least one of the electrodes is separated into sections (41), and the suitable electric field is applied between each section of electrodes (41) and counter electrode (5).

Figure 2:
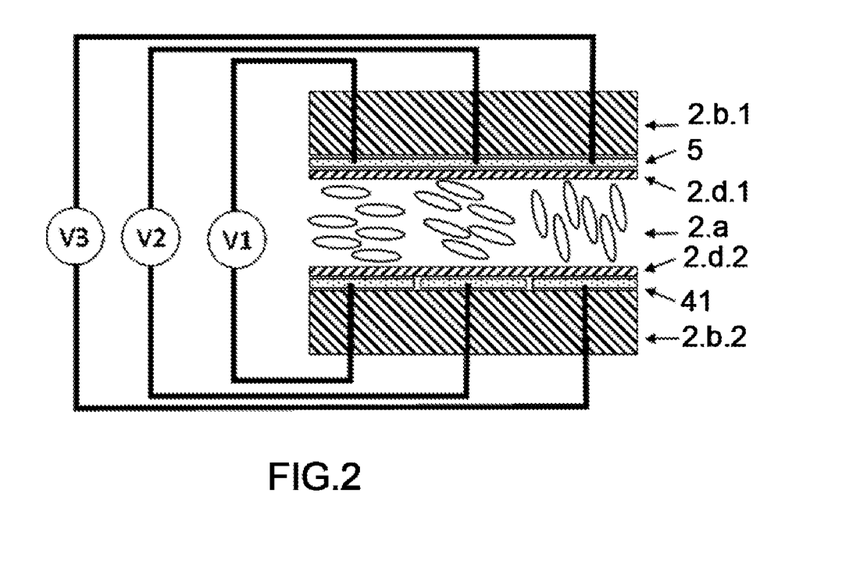
FIG. 2 shows a schematic view of a liquid crystal cell wherein the first electrode is divided into sections, the LC having positive dielectric anisotropy.
Figure 3:
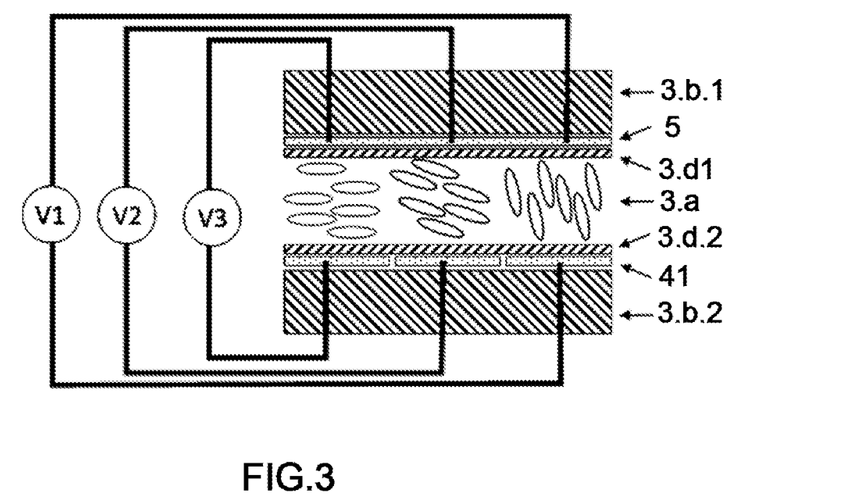
FIG. 3 shows a schematic view of a liquid crystal cell wherein the first electrode is divided into sections, the LC having negative dielectric anisotropy.
Figure 4:
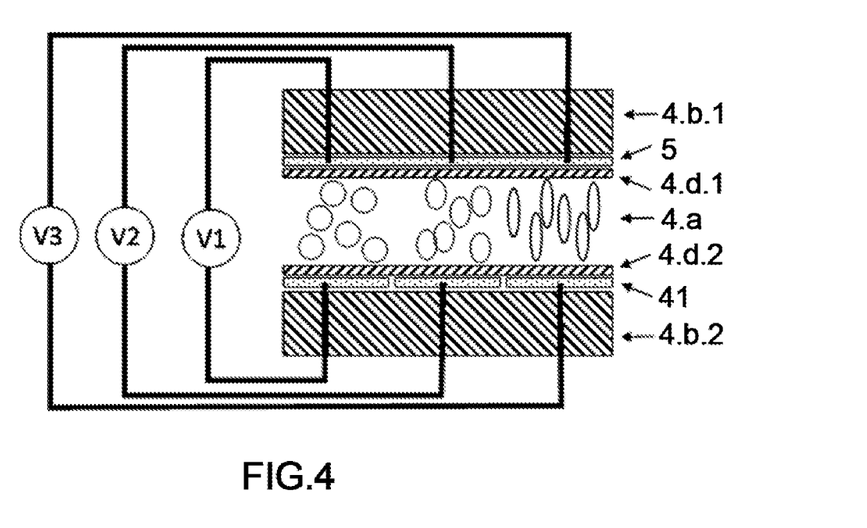
FIG. 4 shows a schematic view of a blue phase LC.

FIGS. 2, 3 and 4 show three different commutation states corresponding to three different commutation voltages (V1<V2<V3) in a positive nematic LC (2.$a$ in FIG. 2), a negative nematic LC (3.$a$ in FIG. 3) and a blue phase LC (4.$a$ in FIG. 4). In each of the figures, the layers marked b and d, as well as the electrode layer (4, 5), are analogous to the layers of the optical element (1) in FIG. 1. The state of the LC is denoted by ellipses (the ellipticity indicates the degree of anisotropy) and the orientation indicates the macroscopic orientation of the optical axis.

The alignment layers (d) of the nematic cells (FIGS. 2 and 3) are conditioned to produce a homogeneous alignment in the case of liquid crystals with positive dielectric anisotropy (FIG. 2) and a homeotropic alignment in the case of liquid crystals with negative dielectric anisotropy (FIG. 3). Thus, the commutation of the LC occurs in a plane perpendicular to the substrates (in FIGS. 2 and 3 in the plane of the paper). For the blue phase LC, the alignment layers (d in FIG. 4) are not essential.

Figure 5:
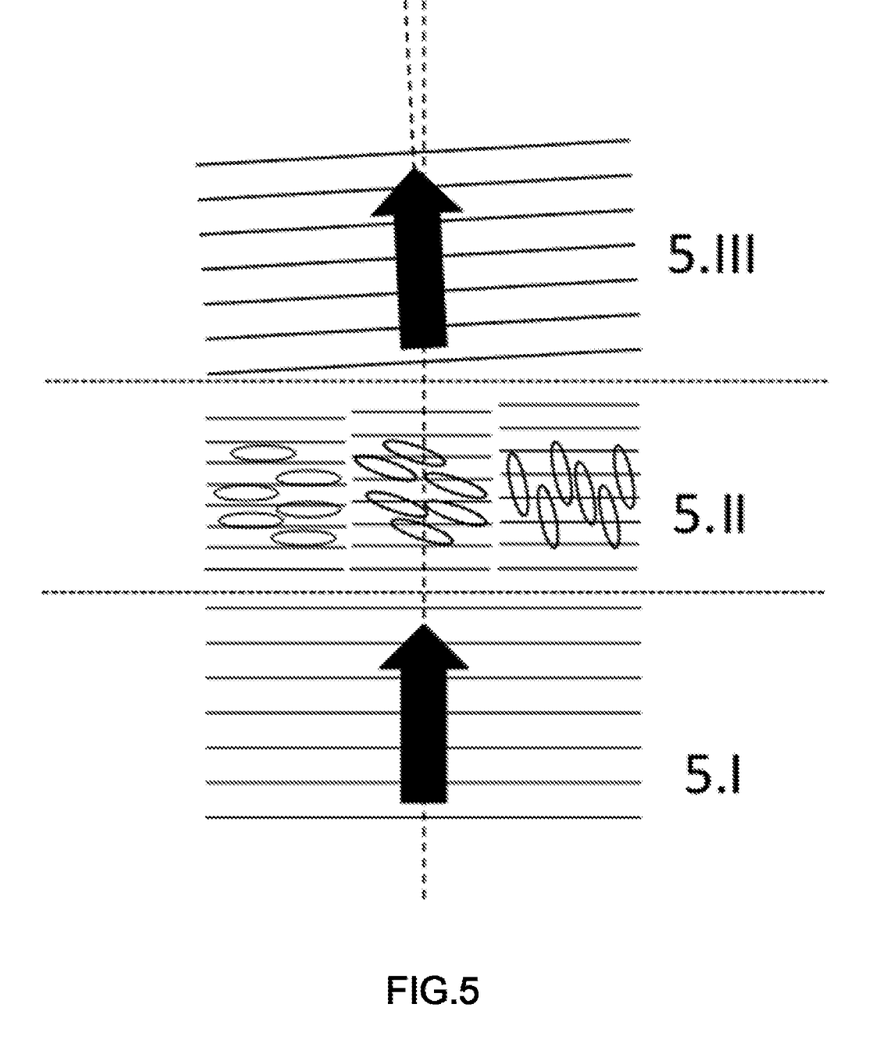
FIG. 5 schematically shows the effect that the different degrees of nematic LC commutation (FIGS. 2 and 3) have on an incident light beam linearly polarised in the same plane of the paper.

FIG. 5 shows the effect that the different degrees of commutation of the nematic LC (FIGS. 2 and 3) have on an incident light beam that is linearly polarised in the same plane of the paper. Light hits from an isotropic medium (5.I), passes through an anisotropic medium (5.II) and exits to a new isotropic medium (5.III). If the dimensions of the sections of the electrodes (41) are small enough, the light recombines in a direction slightly deviated from the incident direction. Solid horizontal or almost horizontal lines show the progression of the beam assuming a flat incident wave.

Figure 6:
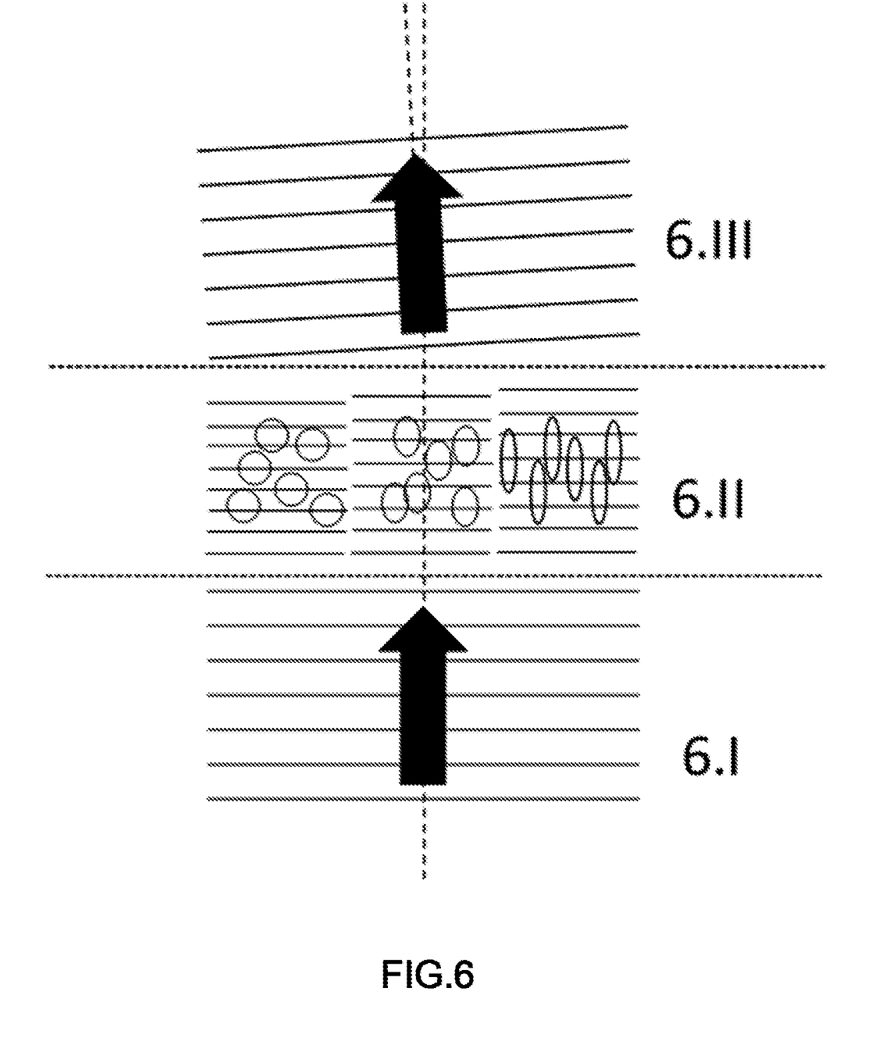
FIG. 6 shows a situation identical to the one shown in FIG. 5, in a blue phase LC device like the one shown in FIG. 4.

FIG. 6 shows an identical situation to FIG. 5 in a device with blue phase LC (6.II) as described in FIG. 4. In this case, the incident beam does not need to be polarised.

The devices of the invention are made up of an optical element (1) or various optical elements (1) or LC cells assembled in series. Each of them introduces a spatial distribution of relative phase differences to an incident wavefront. The induced phase difference ranges from 0 to a full wavelength ($\lambda$), equivalent to a range of 0-360° or 0-2$\pi$ radians. According to the embodiment of the invention in question, the LC cells can be joined or separated by a certain distance. In the second case, the cells can emulate composite optical elements, such as telescopes or beam expanders.

Each cell functions similarly to a spiral diffractive lens (SDL) or a spiral phase plate (SPP). In these lenses in the form of plates, the phase equivalence between lags of multiples of 2$\pi$ radians is used, which makes it possible to reduce the optical thickness of the device in intervals equivalent to lags of 2$\pi$. The phase difference can be achieved by modifying the physical thickness—a microscopic version of the well-known Fresnel lenses—or the effective refractive index, as in the examples shown in FIGS. 2, 3 and 4.

Figure 7:
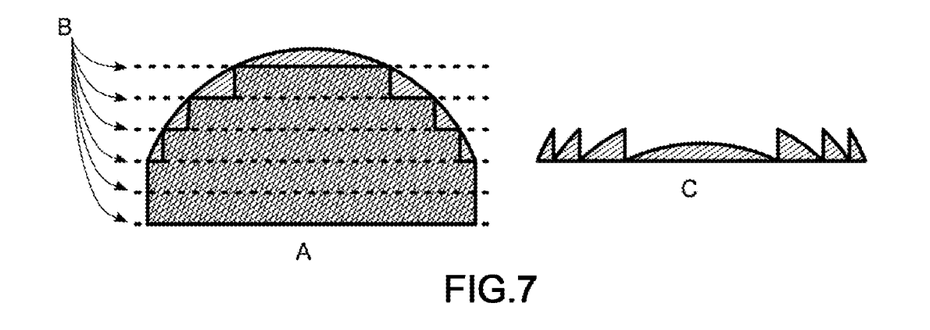
FIG. 7 shows an example of a diffractive lens in phase (Fresnel lens) (C), the effect of which on the phase is equivalent to that of a thick lens (A).

FIG. 7 shows an example of a diffractive lens with phase (C), the effect of which on the phase is equivalent to that of a thick lens (A). The lens is cut into sections (B) the thickness of which is $\lambda/(n1-n2)$, wherein n1 is the index of the material (typically glass, n1≈1.5) and n2 is the index of the surrounding medium (typically air, n2≈1.0).

The diffractive lens has a spatial OPL variation from 0 to $\lambda$, but has the same operation, in a first approximation, as the thick lens with a much greater OPL variation.

The relative phase lag, $\delta$, between different regions of the wavefront propagating through different points of the diffractive lens is $(2\pi/\lambda)\cdot(n1-n2)\cdot d$, wherein d is the thickness. Each section produces relative lags, $\delta$, between 0 and $2\pi$ for thicknesses d between 0 and $\lambda/(n1-n2)$.

In the case shown in FIG. 7, the difference in lag, or in OPL, comes from the wavefront propagating in different proportions in different media (typically air and the glass or plastic lens).

The same spatial OPL variation can be achieved with a flat device with parallel faces wherein d is constant, but wherein there is a spatial distribution of refractive indices in sections equivalent to those mentioned above.

Although currently the electro-optical material easiest to adapt to the proposed device would be the LC commutated by an electric field, the state of the LC can be modified by means of a magnetic field, or heat, achieving the same effect.

There are also alternative materials such as lithium niobate (LiNbO3), or liquids that exhibit the Pockels or Kerr effect, which are electro-optical and the refractive indices of which can be altered or reoriented by applying an electric field.

The present invention relates to an optical device formed by a reconfigurable optical element (1), typically made of LC, or various reconfigurable optical elements (1), typically made of LC, in series, adhered to one another, or located at a certain distance. The elements possess certain variable optical properties which can be modified by external control. The LC elements are spiral diffractive lenses (SDL) the topological charge and focal length of which can be reconfigured. The focal length of the element can be designed to be finite or infinite. If the focal length is infinite, the SDL transforms into a spiral phase plate (SPP) like the ones shown in FIG. 8. The sections of the electrodes (41) of these plates have the shape of non-spiral circular sectors (FIGS. 13A and 13B); the name of the SPP plate refers to the spiral profile adopted by the phase lag.

The spiral diffractive lenses SDL with finite focal length are manufactured with LC cells whose sections of the electrodes (41) have the shape of spiral sectors. Each section (41) has an origin very close to the centre, and it widens and rotates as it approaches the external perimeter region. All the sections of the electrodes (41) reach the perimeter region, so that they can be connected to the external control electronics by direct excitation with independent contacts.

The spiral shape of the sections of the electrodes (41) (see FIGS. 14A and 14B) determines the distortion of the wavefront produced as a result of the action of the two LC elements in series. The device with two LC elements in series is capable of emulating a diffractive lens having a conventional phase (FIG. 7C) with a fidelity depending on the number of sections of the electrodes (41). An infinite number of elements would be needed to exactly emulate a diffractive lens having an ideal phase; the greater the number of sections of the electrodes (41), the greater the approximation achieved.

Different embodiments of the invention are described below.

The first of the preferred embodiments consists of two elements in series.

Figure 8A:
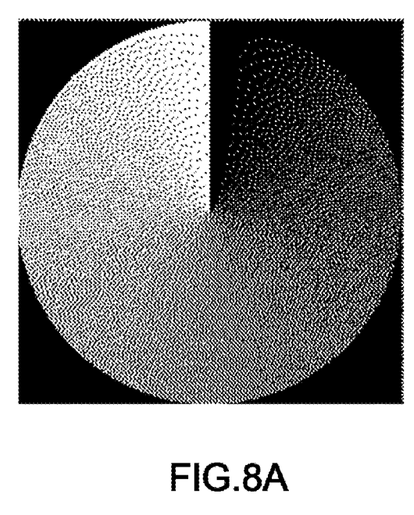
FIG. 8A schematically shows an example of spiral phase plates (SPPs) with topological charge 1.
Figure 8B:
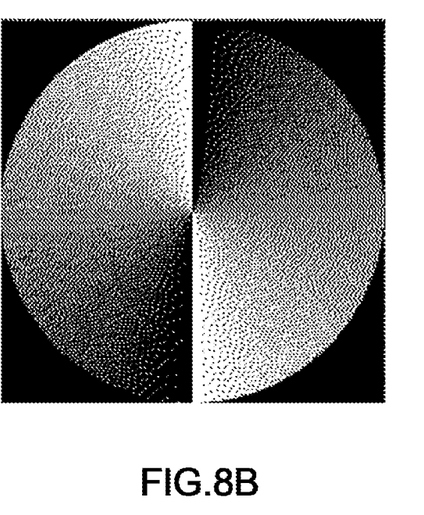
FIG. 8B schematically shows an example of spiral phase plates (SPP) with topological charge 2.

In this embodiment, one of the LC cells is a spiral phase plate (SSP), with a reconfigurable azimuthal variable phase profile, as shown in FIGS. 8A and 8B. The darkest shading corresponds to a phase difference of zero radians, while the lighter region represents a difference of $2\pi$ radians. The patterns shown in the figures correspond to lag plates which generate optical vortices with a topological charge of 1 (FIG. 8A) and 2 (FIG. 8B). The patterns shown in FIGS. 8A and 8B are two configurations of the same element.

The other reconfigurable LC element of this embodiment has a spiral component formed by a number of sections of the electrodes (41) which are excited at different voltages with the aim of generating a phase lag profile between 0 and $2\pi$ radians.

Figure 9A:
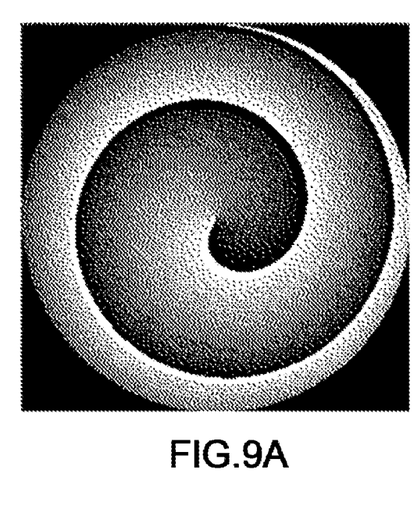
FIG. 9A shows a spiral diffractive lens (SDL) wherein a hyperbolic radial phase variation with a topological charge 1 has been introduced.
Figure 9B:
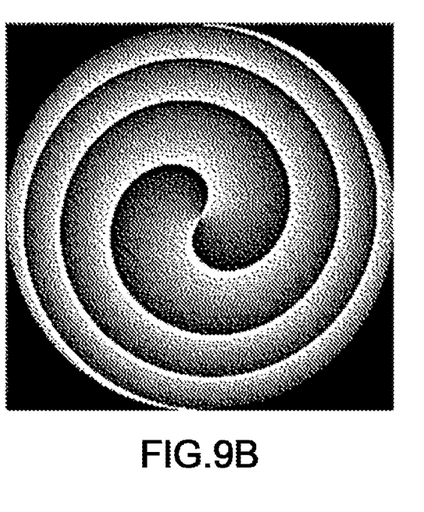
FIG. 9B shows a spiral diffractive lens, SDL, wherein a hyperbolic radial phase variation with a topological charge 2 has been introduced.

FIG. 9A shows the element is in a spiral diffractive lens (SDL) configuration introducing a hyperbolic radial phase variation with a topological charge of 1; in the configuration of the same element in FIG. 9B, the radial phase variation is also hyperbolic, but the topological charge is 2 and the focal length is half that of FIG. 9A. In general, the topological charge is determined by the number of spirals, while the focal length is smaller the greater the rotation of each spiral is. As in the previous item, the greyscale range shows lags ranging from 0 (black) to $2\pi$ radians (white). The patterns shown in FIGS. 9A and 9B are two configurations of the same element.

Figure 10A:
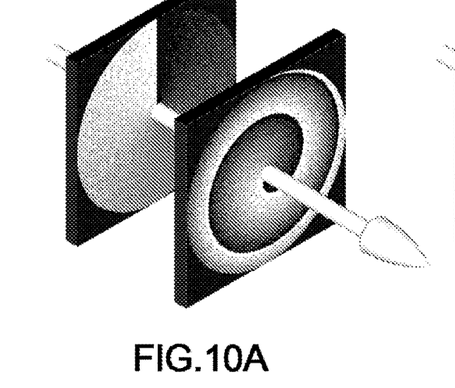
FIG. 10A shows an embodiment consisting of a spiral phase plate (SPP) creating optical vortices in series with the spiral diffractive lens (SDL) of FIG. 9A.
Figure 10B:
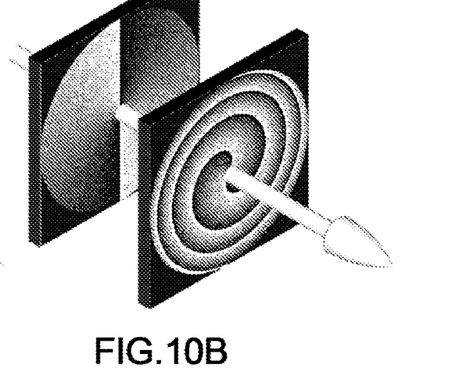
FIG. 10B shows an embodiment consisting of a spiral phase plate (SPP) creating optical vortices in series with the spiral diffractive lens (SDL) of FIG. 9B.

FIG. 10 shows the embodiment consisting of a spiral phase plate (SPP) generating optical vortices in series with a spiral diffractive lens (SDL). The central axis is indicated, which usually coincides with the optical path. The two mentioned configurations appear in FIGS. 10A and 10B.

Figure 11A:
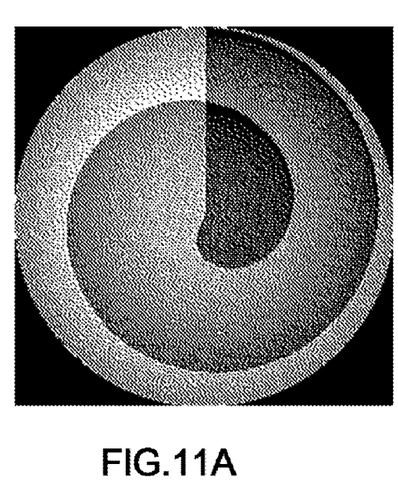
FIG. 11A shows a front view of the arrangement shown in FIG. 10A.
Figure 11B:
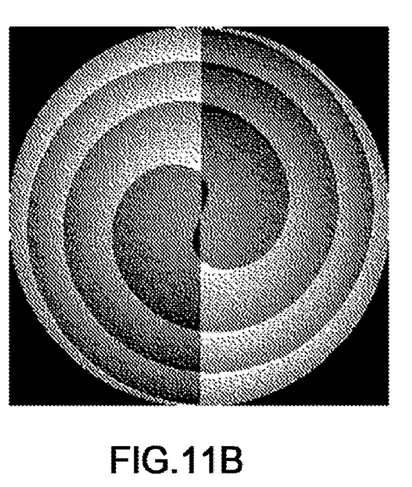
FIG. 11B shows a front view of the arrangement shown in FIG. 10B.

Placing the spiral phase plate of FIG. 8A with the spiral diffractive lens of FIG. 9A in series generates a phase lag equivalent to the phase plate shown in FIG. 11A. Similarly, the spiral phase plate of FIG. 8B in conjunction with the spiral diffractive lens of FIG. 9B produces a lag equivalent to the phase plate of FIG. 11B. The phase lags of FIGS. 11A and B range from 0 (black) to $4\pi$ radians (white).

Figure 12A:
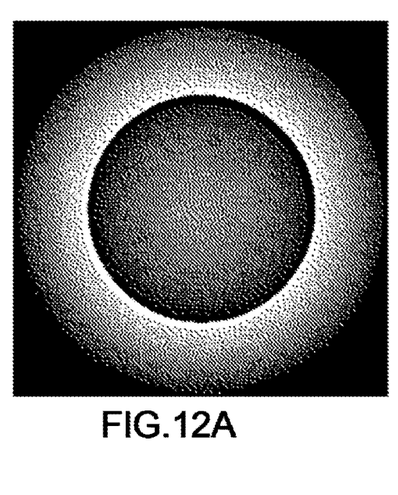
FIG. 12A shows the result of "slicing" the arrangement shown in FIG. 11A into 27 sections.
Figure 12B:
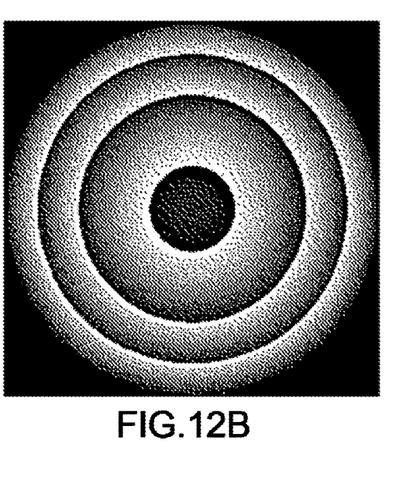
FIG. 12B shows the result of "slicing" the arrangement shown in FIG. 11B into 27 sections.

The distributions in FIG. 11 can be sliced into $2\pi$ sections, taking advantage of the phase equivalence between lags of multiples of $2\pi$ radians, in a manner analogous to the lens in FIG. 7A. As a result, the phase distributions of FIG. 12 are obtained. The phase lags of FIGS. 12A and B range from 0 (black) to $2\pi$ radians (white).

The two phase difference maps of FIG. 12 correspond to diffractive lenses having a phase with a hyperbolic phase variation underlying the definition of the spiral diffractive lenses (SDL) of FIG. 9. The maps, and consequently the two configurations, therefore correspond to two diffractive lenses having a phase with different foci.

Figure 13A:
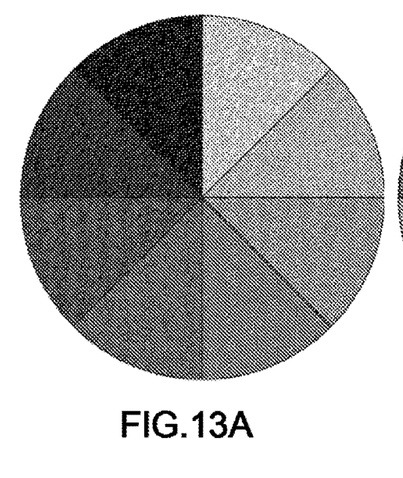
FIG. 13A shows a simplified 8-electrode structure used to generate vortices with topological charges of 1.
Figure 13B:
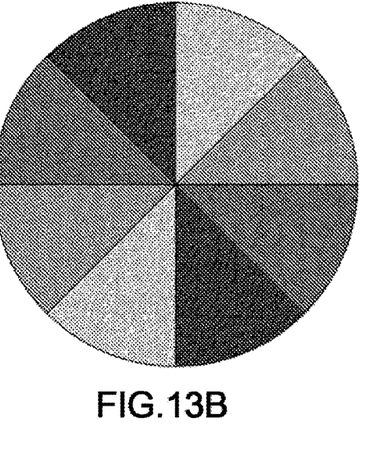
FIG. 13B shows a simplified 8-electrode structure used to generate vortices with topological charges of 2.

To emulate the spiral phase plates generating optical vortices, shown in FIG. 8, a geometry of electrodes in angular sections (41) common to both structures can be used. FIG. 13 shows a simplified structure of 8 sections of electrodes (4) which is used to generate topological charges of 1 (FIG. 13A) and 2 (FIG. 13B). The greyscale in FIG. 13 represents different electric field intensities applied to the electrodes. The applied field is larger the lighter the level of grey.

Figure 14A:
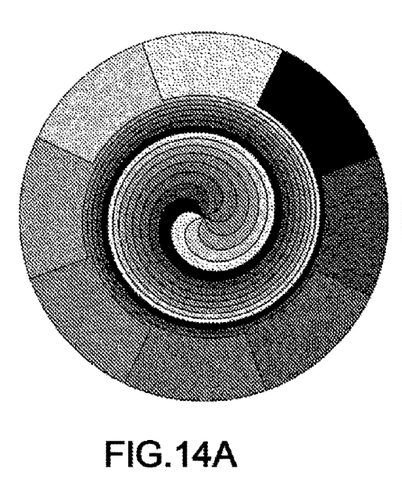
FIG. 14A shows a diffractive lens with a simplified 8-electrode structure for generating spiral diffractive lenses (SDL) with topological charges of 1.
Figure 14B:
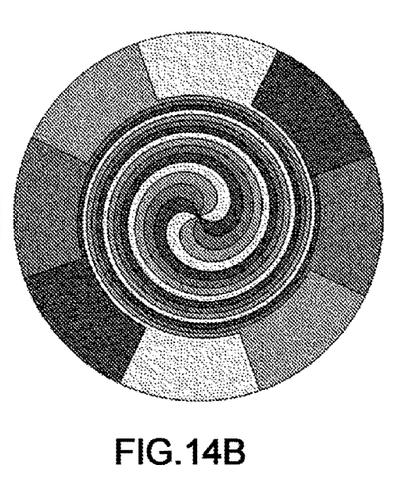
FIG. 14B shows a diffractive lens with a simplified 8-electrode structure for generating spiral diffractive lenses (SDL) with topological charges of 2.

Similarly, the spiral diffractive lens structures of FIG. 9 can likewise be approximated with a common geometry of sections of the electrodes (41), as shown in FIG. 14. As in the previous case, a simplified structure with 8 sections of the electrodes (41) is used to generate topological charges of 1 (FIG. 14A) and 2 (FIG. 14B). The greyscale in FIG. 14 represents different electric field intensities applied to the sections of the electrodes (41), with the aim of generating equidistant phase differences in the LC cells. The applied field is the lighter the level of grey.

The active area in FIG. 14 is reduced to the spiral region. The external portion is only a visual guide for observing the eight sections of electrodes (41) directed in both topologies and can potentially be the connection region of the sections of electrodes (41).

By combining two LC cells in series, one with the pattern of sections of electrodes (41) of FIG. 13, and the other with the pattern of FIG. 14, a device is achieved which functions as a diffractive lens such as the ones shown in FIG. 12. The focal length can be varied between two or more values, modifying the voltages applied to each of the sections of electrodes (4).

The number of different focal lengths that can be achieved is determined by the number of sections of electrodes (4) containing both patterns. Likewise, the number of sections of electrodes (4) establishes the higher or lower fidelity with which the discrete pattern of electrodes reproduces the ideal analogue phase variation. In the examples in the figures, only 8 electrodes have been used for simplicity. Actual devices of the invention generally include tens or hundreds of sections of electrodes (41).

The second preferred embodiment is formed by two LC cells with sections of electrodes (41) which form reconfigurable spiral diffractive lenses. The fundamental feature thereof is that the cells have opposite topological charges: one of them increases the phase differences in a clockwise direction while the other increases them in an anticlockwise direction. The two lenses are designed with the same topological charge and focal length. The topological charges cancel out, for which reason the resulting phase difference lacks angular momentum. In this manner, a diffractive lens is obtained which behaves like conventional diffractive lenses, with the advantage of being reconfigurable and with the connection of the sections of electrodes (41) in the perimeter region (3) or outer portion, leaving the active region (2) or inner portion with the entry surface and the outlet surface thereof free and clear of connections and electronic components.

Figure 15A:
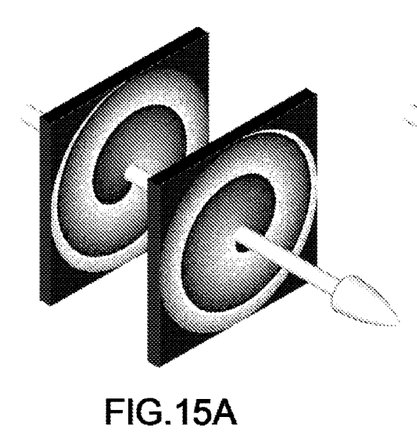
FIG. 15A shows two spiral diffractive lenses in series, with topological charges of 1 and −1.
Figure 15B:
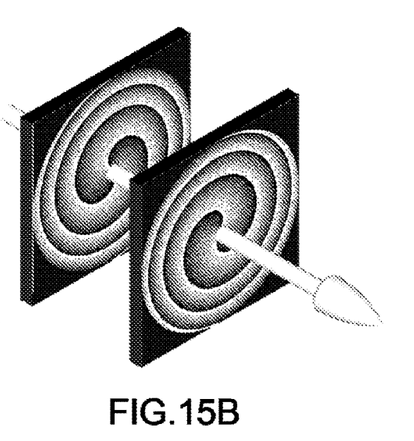
FIG. 15B shows two spiral diffractive lenses in series, with topological charges of 2 and −2.

FIG. 15 shows two spiral diffractive lenses in series. The lenses of FIG. 15A are configured to have topological charges 1 and −1, while those of FIG. 15B are configured to have topological charges 2 and −2.

Figure 16A:
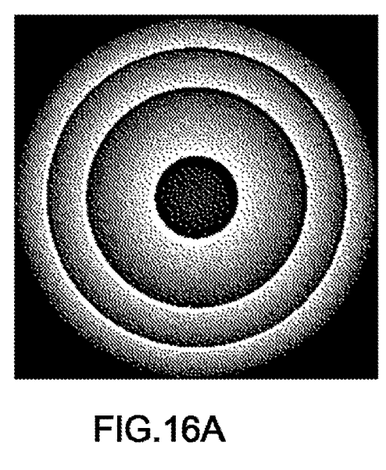
FIG. 16A shows the result of linking the spiral diffractive lenses of FIG. 15A.
Figure 16B:
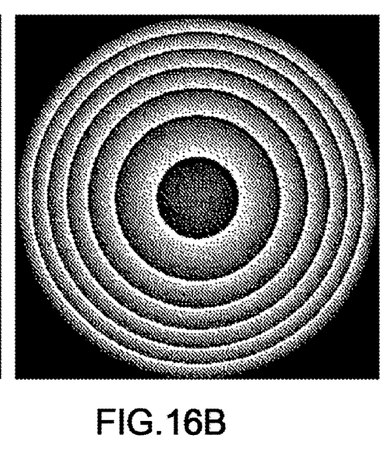
FIG. 16B shows the result of linking the spiral diffractive lenses of FIG. 15B.

By linking the spiral diffractive lenses of FIG. 15A in series, and slicing the maps of exiting phase differences into 27 sections, taking advantage of the phase equivalence between lags of multiples of $2\pi$ radians, they produce a distribution of phase differences (FIG. 16A) analogous to the one shown in FIG. 12. Similarly, the spiral lenses of FIG. 15B generate the distribution shown in FIG. 16B.

In a manner analogous to the first preferred embodiment, both configurations of FIG. 16 can be achieved with the same pattern of sections of electrodes (41) by applying different electric fields, as shown in FIG. 14.

The two LC cells of the second preferred embodiment can be identical, provided that in the assembly in series one of the cells is turned, by making two equal faces face each other so that the direction of rotation of the spiral is reversed, causing the sign of the topological charge to be opposite in each cell.

In the third preferred embodiment, two reconfigurable LC cells are used in series configured with opposite topological charges, in other words, they increase the phase in a clockwise and anticlockwise direction, respectively. The cells have sections of electrodes (41) configured as spiral diffractive lenses. Unlike the second preferred embodiment, the spirals are not necessarily adjusted to generate the same focal length, even though the number of spirals—and consequently the topological charge—is the same. Thus, the exiting beam will have a phase difference profile without any induced angular momentum.

The two preferred embodiments above are particular cases of this. The first embodiment would be an extreme case wherein one of the LC cells is a spiral diffractive lens with infinite focal length, in other words, a spiral phase plate. The second one is the case wherein the focal length of both lenses is the same.

Figure 17A:
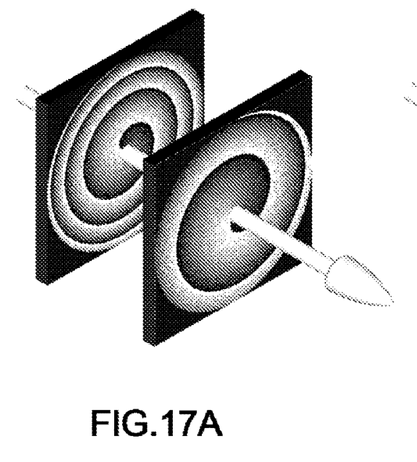
FIG. 17A shows the linking in series of two different spiral diffractive lenses, with topological charges of 1 and −1.

FIG. 17 shows different spiral lenses, with topological charges equal to two by two but with opposite signs. Each of the cells has a variable focal length. FIG. 17A shows two cells configured with topological charges 1 and −1, respectively. By placing the lenses in series, a distribution of phase differences is produced which, if sliced into 27 sections like the ones shown in FIG. 12, it generates a spiral diffractive lens like the one shown in FIG. 18A.

Figure 17B:
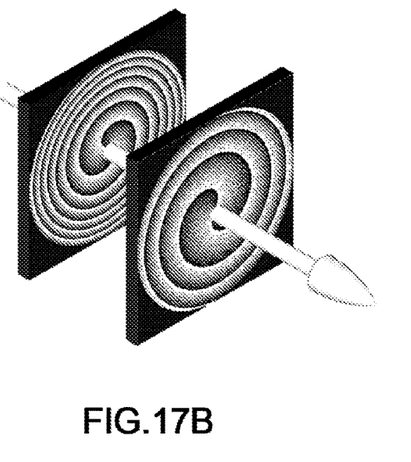
FIG. 17B shows the linking in series of different spiral diffractive lenses, with topological charges of 2 and −2.
Figure 18A:
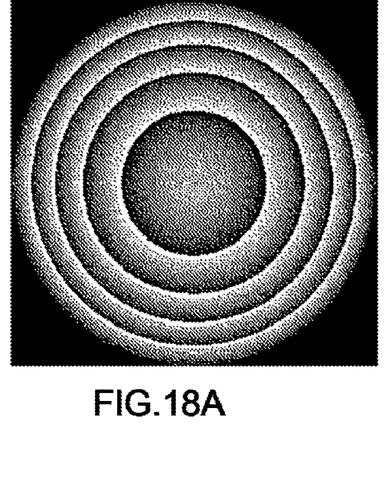
FIG. 18A shows the result of linking the spiral diffractive lenses of FIG. 17A.
Figure 18B:
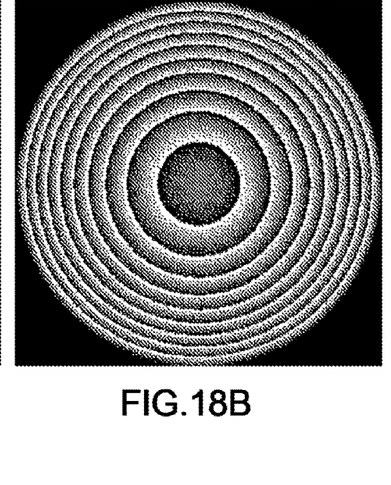
FIG. 18B shows the result of linking the spiral diffractive lenses of FIG. 17B.

FIG. 17B shows two cells configured with topological charges 2 and −2, respectively. By placing the plates in series, a distribution of phase differences is produced which, if sliced into 27 sections like the ones shown in FIG. 12, it generates a lens with a diffractive phase like the one shown in FIG. 18B.

In this third preferred embodiment, the pattern of sections of the active electrodes (41) of the two LC cells is generally different. For example, one of the cells could have a pattern like the one shown in FIG. 14, while the other one could have a different, more twisted pattern, like the one shown in FIG. 19. The spiral lenses generated by the elements of FIG. 19, for any non-zero topological charge, have a shorter focal length than the equivalent lenses of FIG. 14.

In the fourth preferred embodiment, the LC cells forming the device do not necessarily have complementary topologies. As a consequence, the equivalent spiral diffractive lens will be a plate with a topological charge of the sum of the two cells. This embodiment may have application in systems wherein the topological charge is irrelevant to the functional nature thereof. It would also be useful in systems wherein it is important to maintain the central singular point, characteristic of light beams with topological charge; in such cases, obviously, the cancellation of topological charges is not suitable.

The three preferred embodiments above are particular cases of this.

In the fifth preferred embodiment, the conventional continuous electrode (5) or the patterns of conventional electrodes mentioned in this invention are substituted for excitation of the liquid crystal and consequent generation of phase differences. The electrodes are replaced by a matrix of interconnected resonant poles. These poles typically resonate at frequencies in the microwave region (GHz or THz), as described in WO 2012080532 A1. The structure of the device remains the same, like the one drawn in FIG. 1, and the device generates the same type of phase displacement patterns as the ones shown above.

The fundamental difference is in the interaction between the electromagnetic wave and the device: The phase displacement is not the consequence of a lag of the electromagnetic wave when passing through a material having a variable index, as in the previous embodiments, but the consequence of the interaction between the electromagnetic wave and dipoles (or sections of electrodes) with frequencies having a variable resonance. By altering the resonance frequency of a dipole, or set of dipoles, the phase displacement introduced into the electromagnetic wave is altered. The resonant frequency of a dipole—and consequently the phase lags introduced by the dipole—is determined by the commutation state of the adjacent LC. As in the cited patent, the commutation state of the LC is controlled by connecting the resonant dipoles to a low-frequency AC electrical signal and the desired voltage.

In correspondence with the previous embodiments, all the dipoles corresponding to a section (41) of an electrode (4) are exclusively characterised by a single commutation state of the LC. The dipoles are interconnected and distributed in regions equivalent to the electrodes (4) shown above.

In all the aforementioned implementations, there is the possibility of placing the two optical elements (1) or lenses at a non-zero distance.

According to a sixth preferred embodiment, two spiral diffractive lenses (SDLs) are placed at a given distance, so that the focal lengths of both lenses coincide. By changing the topological charge of both elements, and consequently the focal length thereof, the position of the coincidence point of the focal lengths between both devices can be changed. Thus, a tunable telescope or beam expander, or more complex optical devices, can be generated. If desired, any leftover residual topological charge can be removed by including a third optical element (1), for example a spiral phase plate.

The seventh preferred embodiment is the simplest implementation of all, but can only be applied in environments wherein the topological charge of the exiting beam is irrelevant. This could be the case of an intraocular lens such as the one in US 005408281 A. The embodiment consists of a single element, with the specific electrode design described above, and the eventual application thereof as a focusing device, specifically where the generation of lenses with a reconfigurable focus represents an innovative contribution.

The LC devices generally have a pattern of sections of electrodes (41) in a first electrode (4) (or first plate) of the cell and a counter electrode (5) or continuous electrode in the opposite portion of the cell; this counter electrode (5) (or second electrode) is known as the ground plane and is shown continuous in FIGS. 2, 3 and 4.

The eighth preferred embodiment is a variation of the elements of the previous embodiments, minus the fifth embodiment. The difference lies in the fact that the counter electrode (5) of one or more elements is divided into sections (41) just like the first electrode (4) in the same optical element (1) (FIGS. 2, 3 and 4). But the pattern of sections in the counter electrode (5) is different from the pattern of sections (41) in the first electrode (4).

Figure 19A:
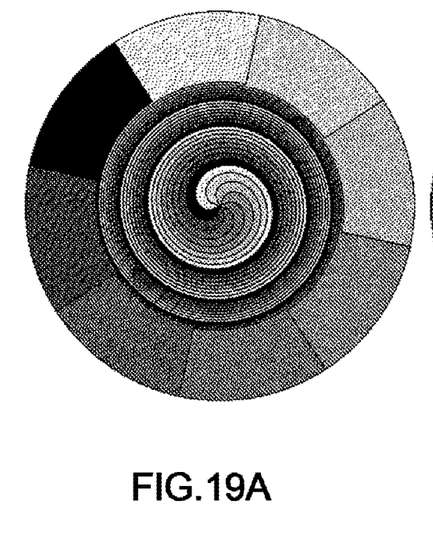
FIG. 19A shows a spiral diffractive lens structure like the one shown in FIG. 14A, but with a more twisted spiral pattern.
Figure 19B:
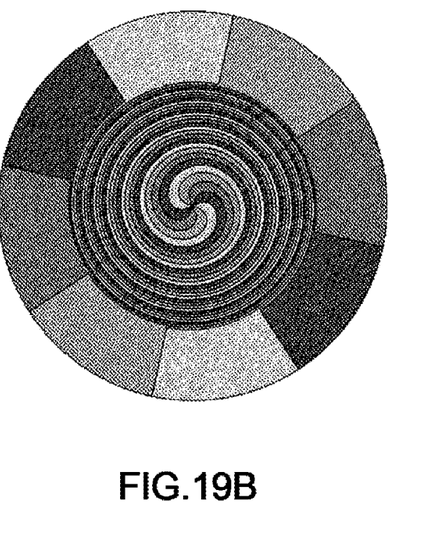
FIG. 19B shows a spiral diffractive lens structure like the one shown in FIG. 14B, but with a more twisted spiral pattern.

In this manner, one of the electrodes (4 or 5) could have the pattern corresponding to a spiral lens like the one of FIG. 14, while the other adjacent electrode (5 or 4) of the same cell could have the pattern corresponding to the spiral lens of FIG. 19.

If two patterns of electrodes (4 and 5) are had in the same cell, which reconfigurable spiral lens structure is activated can be chosen by directing, leaving the spiral of the counter electrode (the electrode (5 or 4)) of the cell with all the sections thereof interconnected to each other at the same voltage.

In a ninth preferred embodiment, one or more elements are filled with a polymerisable liquid crystal. This allows the devices to be tuned with an electric field and to be cured while the electric field is applied (usually by means of UV light), thereby obtaining a fixed lens profile, once the liquid crystal has polymerised. Once the LC has polymerised, the lens can be removed from the cell thereof as an extremely fine lens, whereby the electrodes (4 and 5) in this embodiment are not necessarily transparent.

This embodiment represents an innovative way to manufacture fixed lenses, with or without topological charge, which can be used linked with other fixed or adjustable optical elements.

The shape of the sections (41) of the electrodes (4) or of both electrodes (electrodes and counter electrodes), in one or more LC elements, determines the features of the lens, both regarding the nominal focal length thereof and in the spherical aberrations thereof. It is trivial to generate lenses with a hyperbolic, spherical or any other quadratic profile, or axicons; it is even possible to introduce spherical or other aberrations by designing the sections of the electrodes suitably.

Thus, the process for designing the first electrodes (4) or active electrodes is as follows:

The lens is defined with the desired profile, including aberrations, if appropriate.

This lens is sliced into sections 0-2π, corresponding to a diffractive lens.

A spiral phase plate configured as an optical vortex of the desired topology is subtracted from this diffractive lens.

The resulting spiral diffractive lens is sliced again in 0-2π intervals.

The analogue variation is discretised according to the number of discrete sections (41) that are going to be used.

Each of the discrete sections (41) extends from the periphery of the LC cell to the centre (the section can be continuous or a dipole set).

For each discrete section (41) a contact region is defined outside the active region.

The two electrodes are manufactured and treated with a suitable alignment layer or agent.

The cell is assembled with at least one, or potentially two electrodes (4 and 5) with the designed patterns.

The cell is filled with the desired liquid crystal, which has the suitable birefringence, and is sealed.

The electrical connection is made suited to the number of electrodes.

It is assembled, if relevant, in series with another cell manufactured in a similar manner, although neither the spiral diffractive lenses nor the spiral phase plates creating optical vortices must be necessarily the same.

The result is an LC element or various reconfigurable LC elements which operate linked together, wherein each of them and the assembly must be considered as a spiral diffractive plate with its own topological charge and lenticular profile, which can be reconfigured.

The invention claimed is:

1. A configurable optical device, characterised in that it comprises a configurable optical element with an active region consisting of an entry surface and an exit surface for light beams and a perimeter region, wherein the optical element comprises at least one first transparent electrode divided into sections and at least one transparent counter electrode, wherein the optical element has electrical connections for the electrodes and/or sections, said electrical connections being located in the perimeter region of the optical element, wherein the device is configured so that, upon application of potential differences between each section of the first electrode and the counter electrode, electric fields are generated that selectively alter the degree of commutation of the optical element respectively in regions corresponding to the sections of the first electrode thus creating an optical path profile, which configures a certain topological charge and a certain focus of an incident light beam, according to the pattern of electric fields applied to the sections of the first electrode, wherein the device is configured so that upon application of a first suitable pattern of electric fields, the optical path profile of the optical element corresponds to that of a spiral diffractive lens with a first focal length and a first topological charge, and so that upon application of a second suitable pattern of electric fields, the optical path profile of the optical element corresponds to that of a spiral diffractive lens with a second focal length and a second topological charge, wherein the counter electrode is also divided into sections, and consequently both electrodes are configured both to have different electrical potentials in each section and to have equal electrical potentials in each section, and wherein the section distribution of the first electrode is different from the section distribution of the counter electrode, thus allowing the device to be reconfigured in order to create two independent sets of optical path profiles, which changes the topological charge and the focus of an incident light beam in different ways.

2. The configurable optical device according to claim 1, characterised in that it comprises a first optical element and a second optical element placed in series with the first optical element, wherein the first optical element has the counter electrode thereof not divided into sections, and wherein the second optical element has the counter electrode thereof divided into sections.

3. The configurable optical device according to claim 1, characterised in that it comprises two optical elements placed in series.

4. The configurable optical device according to claim 1, characterised in that the commutation material in one or more of the optical elements is a liquid crystal.

5. The configurable optical device according to claim 1, characterised in that the commutation material in one or more of the optical elements is a polymerisable liquid crystal.

6. The configurable optical device according to claim 2, characterised in that it is configured so that, upon application of the corresponding electric fields, the optical path profile of the adjacent optical elements placed in series corresponds to that of spiral diffractive lenses.

7. The reconfigurable optical device according to claim 2, characterised in that it is configured so that, upon application of the corresponding electric fields, the optical path profile of the adjacent optical elements placed in series corresponds to that of spiral phase plates.

8. The configurable optical device according to claim 2, characterised in that it is configured so that, upon application of the corresponding electric fields, the optical path profile of at least one of the adjacent optical elements placed in series corresponds to that of a spiral diffractive lens and that the profile of at least one of the remaining adjacent optical elements placed in series corresponds to that of a spiral phase plate.

9. The configurable optical device according to claim 6, characterised in that two spiral diffractive lenses are positioned in series, with a certain gap between them, so that the focal lengths of both lenses coincide, which allows them to function as a tunable telescope or beam expander, altering the topological charge and focus of the lenses, applying the suitable patterns of electric fields to the sections of the electrodes of the optical elements.

10. The configurable device according to claim 1, characterised in that one of the electrodes includes structures with electromagnetic resonance frequencies which are variable depending on the commutation state of the adjacent liquid crystal.

11. A method for manufacturing a configurable optical device, characterised in that it comprises:—arranging at least two optical elements, according to claim 1, arranged in series;—applying a pattern of potential differences between the sections of the first electrode and the counter electrode of each optical element, thus producing an electric field that alters the commutation profile and consequently, the optical path profile of the optical element, which changes the topological charge of an incident light beam.

12. The method for manufacturing a configurable optical device according to claim 11, characterised in that the optical elements use liquid crystal as electro-optical material.

13. The method for manufacturing a configurable optical device according to claim 12, characterised in that the optical elements use polymerisable liquid crystal as electro-optical material and wherein the method comprises curing the polymerisable liquid crystal, obtaining a diffractive device with a variation profile having a fixed or partially tunable phase.

14. The method for manufacturing a configurable optical device according to claim 11, characterised in that it comprises applying an electric field between the electrodes of two adjacent optical elements placed in series creating a commutation profile of the two adjacent optical elements corresponding to that of two spiral diffractive lenses.

15. The method for manufacturing a configurable optical device according to claim 14, characterised in that it comprises positioning both spiral diffractive lenses in series, with a certain gap between them, so that the focal lengths of both lenses coincide, which allows them to function as a tunable telescope or beam expander, altering the topological charge of the lenses.

* * * * *